US012739481B2

(12) United States Patent
Wang et al.

(10) Patent No.: US 12,739,481 B2
(45) Date of Patent: Sep. 15, 2026

(54) CREATION OF VIDEOS WITH DESIRED EFFECTS AND QUALITY BASED ON RANDOM RESOURCES

(71) Applicant: International Business Machines Corporation, Armonk, NY (US)

(72) Inventors: Jian Jun Wang, Xi'an (CN); Di Xu, Shanghai (CN); Wen Ting Li, Shanghai (CN); Yu Li, Beijing (CN); Yu Chun Shi, Shanghai (CN); Xiao Xia Mao, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 19/013,228

(22) Filed: Jan. 8, 2025

(65) Prior Publication Data

US 2026/0197538 A1 Jul. 9, 2026

(51) Int. Cl.
*H04N 21/854* (2011.01)
*H04N 21/432* (2011.01)
(Continued)

(52) U.S. Cl.
CPC ......... *H04N 21/854* (2013.01); *H04N 21/432* (2013.01); *H04N 21/44008* (2013.01);
(Continued)

(58) Field of Classification Search
CPC ............... H04N 21/854; H04N 21/432; H04N 21/44008; H04N 21/4666; H04N 21/84; H04N 21/8456
(Continued)

(56) References Cited

U.S. PATENT DOCUMENTS 9,058,845 B2 * 6/2015 Fastige .............. H04N 21/4755
9,129,642 B2 9/2015 Axen et al.
(Continued)

FOREIGN PATENT DOCUMENTS

CN 112784056 B 11/2021

OTHER PUBLICATIONS

Authors et al.: Disclosed Without Attribution. IP.com No. IPCOM000253268D, "Automatic video generation based on machine learning", Mar. 19, 2018, 5 pages.

*Primary Examiner* — Sahar Aqil Riaz
(74) *Attorney, Agent, or Firm* — James Olsen, Esq.; Kevin P. Radigan, Esq.; Heslin Rothenberg Farley & Mesiti P.C.

(57) ABSTRACT

Method and apparatus for automated video creation are provided. The method includes receiving a request to generate a target video for a target object, where the request comprises one or more user-defined requirements for the target video, identifying a plurality of videos containing the target object by performing an object-based search within a database, extracting one or more features by processing the plurality of videos, recognizing one or more editing-related patterns from the one or more features, generating a script for the target video based on the one or more features, the one or more editing-related patterns, and the one or more user-defined requirements, selecting one or more candidate videos, from the plurality of videos, based on the script, and generating the target video by assembling the one or more candidate videos.

20 Claims, 7 Drawing Sheets

(51) Int. Cl.
*H04N 21/44* (2011.01)
*H04N 21/466* (2011.01)
*H04N 21/84* (2011.01)
*H04N 21/845* (2011.01)

(52) U.S. Cl.
CPC ......... *H04N 21/4666* (2013.01); *H04N 21/84* (2013.01); *H04N 21/8456* (2013.01)

(58) Field of Classification Search
USPC .......................................................... 725/116
See application file for complete search history.

(56) References Cited

U.S. PATENT DOCUMENTS

| | | | | |
|---|---|---|---|---|
| 2012/0254753 | A1* | 10/2012 | Andrews | G06F 16/48 715/716 |
| 2013/0151970 | A1* | 6/2013 | Achour | G06Q 10/101 715/723 |
| 2014/0226955 | A1 | 8/2014 | Man | |
| 2015/0243326 | A1 | 8/2015 | Pacurariu et al. | |
| 2016/0005436 | A1* | 1/2016 | Axen | H04N 21/2668 386/240 |
| 2016/0379682 | A1 | 12/2016 | Williams et al. | |
| 2020/0342909 | A1* | 10/2020 | Gandhi | G06F 40/30 |
| 2020/0372935 | A1* | 11/2020 | Matias | G06V 20/48 |
| 2024/0147023 | A1* | 5/2024 | Zhou | H04N 21/816 |
| 2026/0024264 | A1* | 1/2026 | Min | G06Q 30/0271 |

* cited by examiner

CREATION OF VIDEOS WITH DESIRED EFFECTS AND QUALITY BASED ON RANDOM RESOURCES

BACKGROUND

The present disclosure relates to video editing and creation, and more specifically, to creating videos with user-defined effects and quality based on random video resources.

SUMMARY

One embodiment presented in this disclosure provides a method, including receiving a request to generate a target video for a target object, where the request comprises one or more user-defined requirements for the target video, identifying a plurality of videos containing the target object by performing an object-based search within a database, extracting one or more features by processing the plurality of videos, recognizing one or more editing-related patterns from the one or more features, generating a script for the target video based on the one or more features, the one or more editing-related patterns, and the one or more user-defined requirements, selecting one or more candidate videos, from the plurality of videos, based on the script, and generating the target video by assembling the one or more candidate videos.

Other embodiments in this disclosure provide computer-readable media containing computer program code that, when executed by operation of a computer system, performs operations in accordance with one or more of the above methods, as well as systems comprising one or more memories collectively containing one or more programs, and one or more processors, wherein the one or more processors are configured to, individually or collectively, perform an operation in accordance with one or more of the above methods.

DETAILED DESCRIPTION

Figure 1:
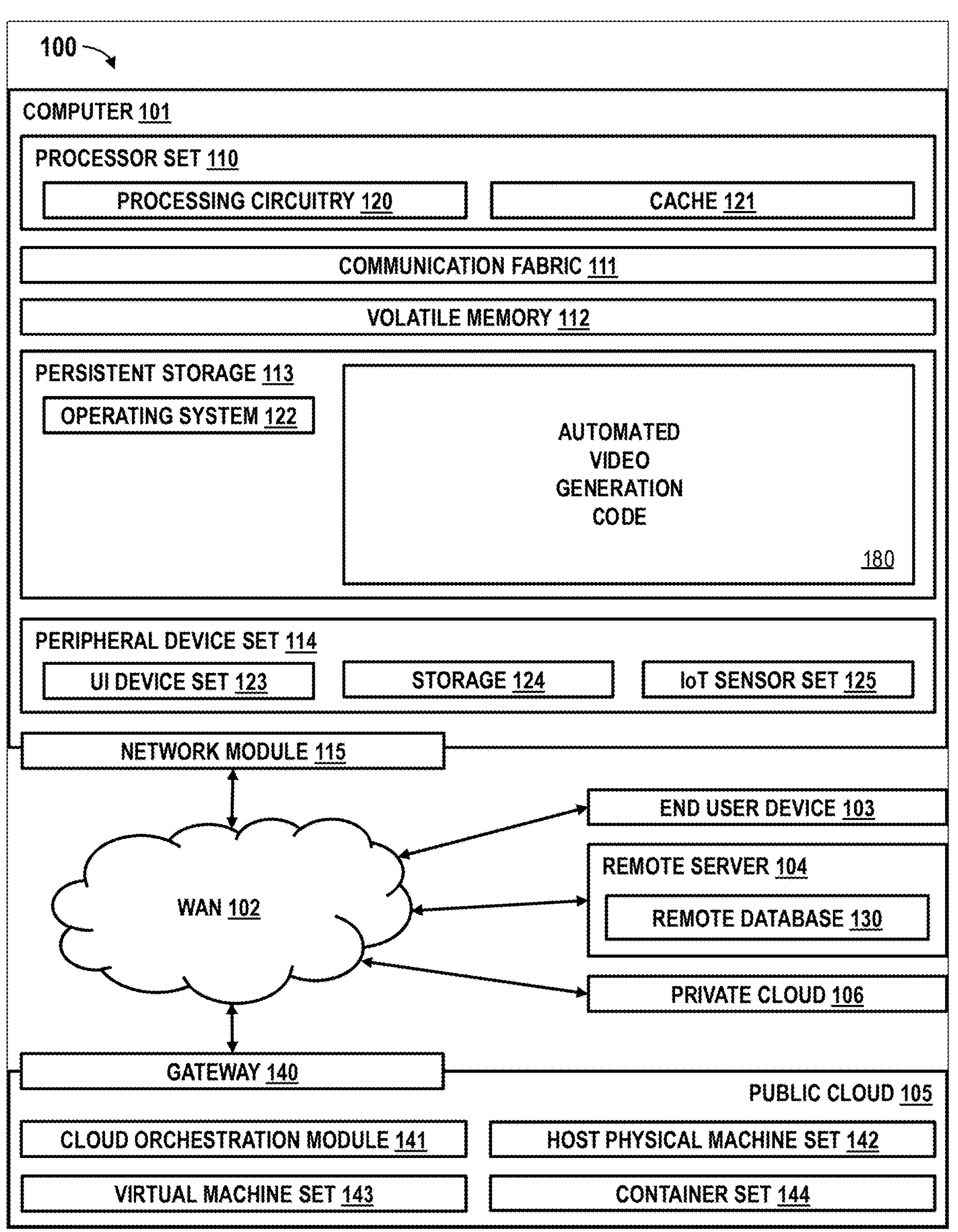
FIG. 1 depicts an example computing environment for the execution of at least some of the computer code involved in performing the inventive methods.

The creation and sharing of video content have become increasingly popular with the rise of online platforms. Advancement in technology, including the development of high-quality cameras, smartphones, and other recording devices, have made capturing video much easier. However, this has also led to a rapid increase in video resources being produced.

As the volume of video content grows, it becomes increasingly difficult for users to manage, review, and edit these clips to create a new video. Traditional video editing tools require users to manually view hours of video to find relevant clips, organize these clips into categories, and assemble the clips together into a cohesive narrative. For large projects, editors often have to create multiple versions and test different combinations of scenes. The overall process often takes a significant amount of time and effort, making it difficult for users to efficiently produce high-quality videos, especially when working on tight deadlines. The traditional methods for video editing and creation become insufficient for the growing demands to handle vast amounts of footage or to produce videos quickly and efficiently.

To address the limitations of traditional video editing, the present disclosure introduces techniques for automated video creation based on random existing video resources. The newly created video aligns with the user's specific requirements or preferences, such as the desired length, the target object, the preferred video quality and effects, and other customizable features. The disclosed system offers a streamlined and efficient way to produce high-quality videos from large dataset by eliminating time-consuming manual tasks, such as categorizing video based on content, selecting relevant clips from random resources, piecing clips together, and applying transitions and additional effects. With this system, users may simply define their preferences and provide them as inputs. The system then automatically analyzes large video datasets, identifies relevant clips, and extracts features and patterns for editing. Based on this information, the system generates a script that outlines the video's structure and selects the most relevant clips to include. Once the clips are selected, the system arranges them in sequence and applies transitions, visual or audio effects, and any additional enhancements according to the script to produce the final target video.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 depicts an example computing environment 100 for the execution of at least some of the computer code involved in performing the inventive methods.

Computing environment 100 contains an example of an environment for the execution of at least some of the computer code involved in performing the inventive methods, such as Automated Video Generation Code 180. In addition to block 180, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and Automated Video Generation Code 180, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in Automated Video Generation Code 180 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in Automated Video Generation Code 180 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICROSERVICES (not separately shown in FIG. 1): private cloud 106 and public cloud 105 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

Figure 2A:
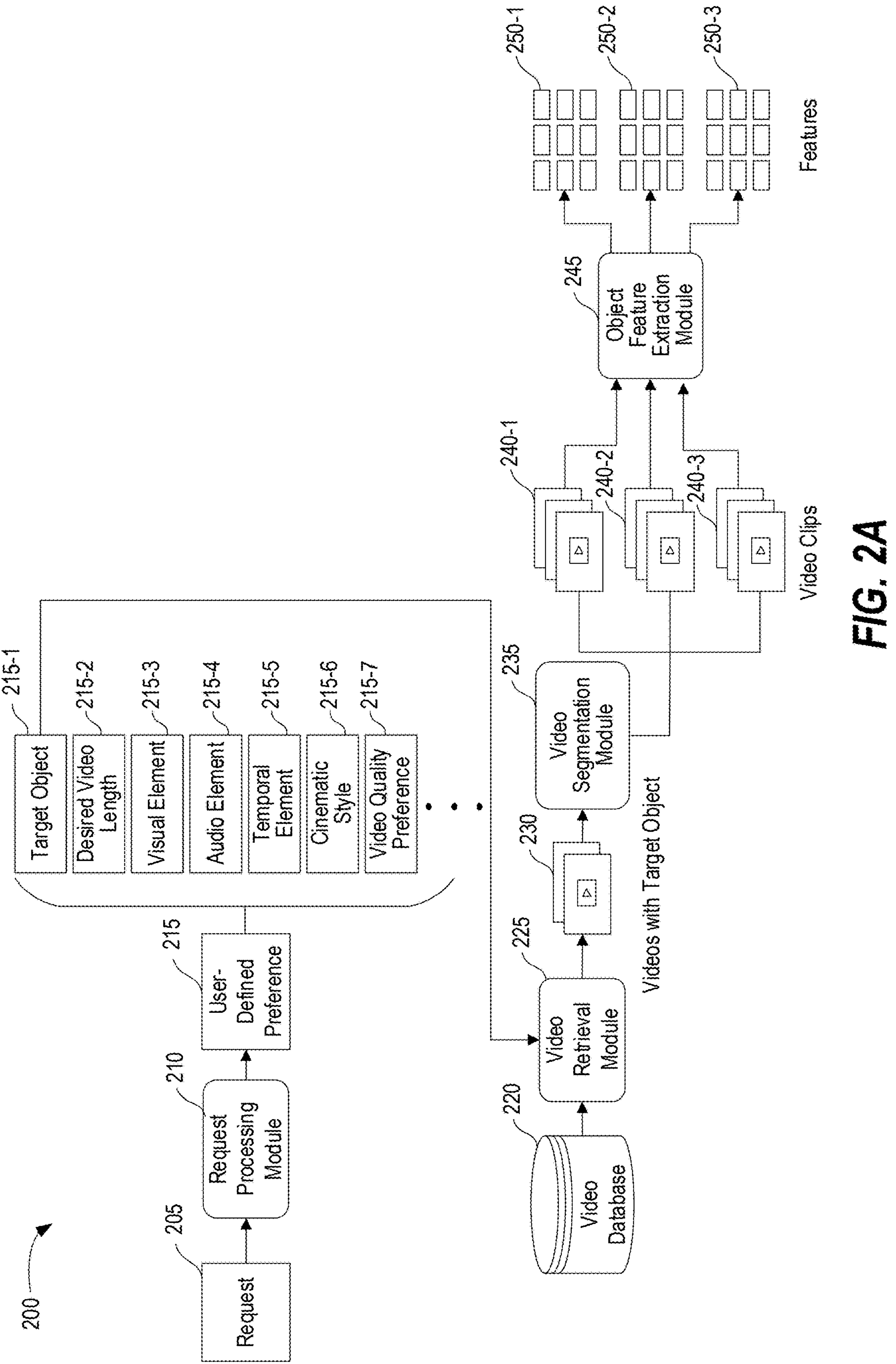
FIGS. 2A and 2B depict an example workflow for creating a video with user-defined requirements based on random video resources, according to some embodiments of the present disclosure.
Figure 2B:
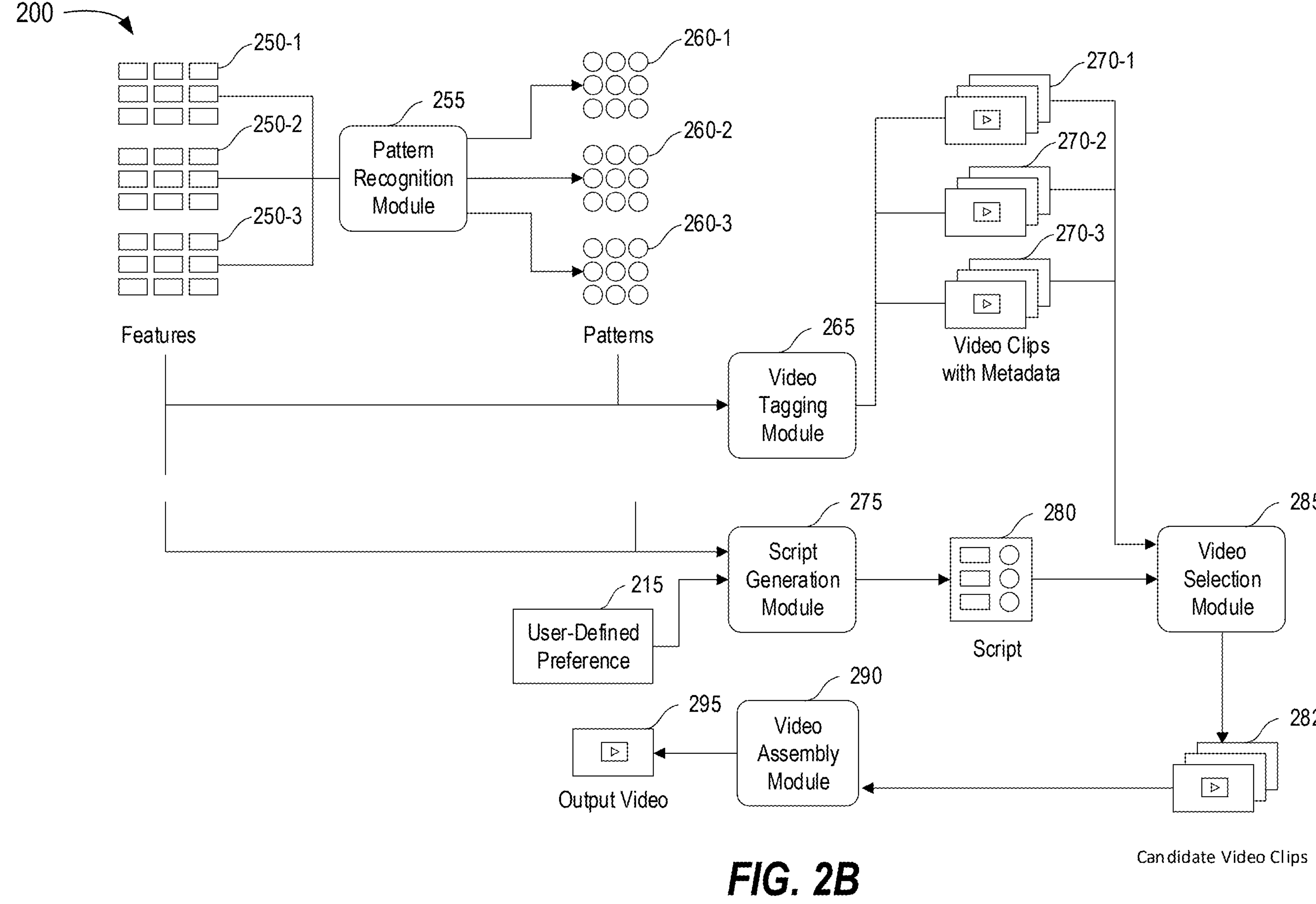

FIGS. 2A and 2B depict an example workflow 200 for creating a video with user-defined requirements based on random video resources, according to some embodiments of the present disclosure.

The workflow 200 depicts a video database 220, which contains a vast collection of video content, as well as one or more software modules (or programming instructions), including a request processing module 210, video retrieval module 225, video segmentation module 235, object feature extraction module 245, pattern recognition module 255, video tagging module 265, video selection module 285, script generation module 275, and video assembly module 290. Each module is configured with specific algorithms and operational parameters to execute designated tasks. Collectively, these modules facilitate the end-to-end automated generation of a video that adheres to user-defined requirements, operating entirely without human intervention. These modules may be deployed on a single computer or distributed across multiple computers within a network. The integration of the video database 220 with these software modules forms an automated video generation system.

As depicted, the automated video generation system receives a user request 205 to generate a video. In some embodiments, the request 205 may include detailed information about the user's preferences for the video, such as the target object(s) to be included, the desired video length, preferred visual style, and any additional specifications. In some embodiments, the request 205 may include long text descriptions in natural language, which needs to be processed to extract relevant keywords and specific requirements before proceeding with video generation.

As shown, the request 205 is processed by the request processing module 210 to extract user-defined preferences (or elements) 215. These elements may include, but are not limited to, the target object 215-1, desired video length 215-2, visual elements 215-3, audio elements 215-4, temporal elements 215-5, cinematic styles 215-6, and video quality preferences 215-7. As used herein, the target object 215-1 refers to the subject that the user intends to present, emphasize, and highlight in the video. The target object may include a specific location, landmark, object, and the like. As used herein, the desired video length 215-2 refers to the total duration of the final video. As used herein, the visual elements 215-3 refer to the visual characteristics identified in the user's input that guide the video creating process, such as environmental conditions, lighting, or scenes. As used herein, the audio elements 215-4 describe the preferred audio settings, such as background sounds, music, or voiceover that align with the video's mood or style. As used herein, temporal elements 215-5 describe the time-related aspect of the video, such as the season or time of day. As used herein, the cinematic styles 215-6 refer to the stylistic approaches the use prefers in terms of camera techniques, framing, and shot types. As used herein, video quality preferences 215-7 provide the user's desired resolution or visual quality of the final output.

An example user request 205 may specify: "Create a video of White Mountain during springtime. The video should show a snowy landscape during the daytime, and include zoom-in close-up shots of wildlife and zoom-out wide-angle shots to show the overall landscape. The video includes background nature sounds and should be in 1080 p quality." From the request, the request processing module 210 extracts keywords across several elements. For example, "White Mountain" may be extracted and identified as the target object 215-1; "2-minute" as the desired video length 215-2; "snowy landscape" and "wildlife" as the visual elements 215-3; "background nature sounds" as the audio element 215-4; "daytime" and "springtime" as the temporal elements 215-5; "zoom-in," "close-up shots," "zoom-out," and "wide-angle shots" as the cinematic styles; and "1080 p" as the video quality preference.

As illustrated, after processing the user request, the target object 215-1 (e.g., "White Mountain") is passed to the video retrieval module 225. This module 225 conducts an object-based search within the video database 220 to find videos that contain the specified target object. The video database 220 may include a diverse collection of video resources. In some embodiments, the database 220 may be integrated with an online platform, so the automated video generation system can access to an expanded collection of video resources from cloud-based or external repositories. In some embodiments, the video retrieval module 225 may use a combination of metadata search and content-based video search techniques. Metadata search may include using pre-existing tags, descriptions, or titles within the database to locate videos containing the target object. Content-based video search may involve the use of object recognition algorithms to analyze the video frames and detect specific landmarks or objects within these frames. Through the initial search, as depicted, the video retrieval module 225 identifies a set of videos containing the target object 230, which are then passed to the video segmentation module 235 for further processing.

In the example workflow 200, the video segmentation module 235 receives the identified videos 230, and proceeds to divide each of these videos 230 into smaller video clips, such as 240-1, 240-2, and 240-3. The segmentation process is targeted to prepare video clips for further detailed feature extraction and pattern recognition. In some embodiments, this segmentation process may divide each video into distinct segments based on video contents (e.g., rather than making random cuts). If multiple frames consistently show the target object (e.g., "White Mountain"), the video segmentation module 235 may group these frames into a single clip until there is a significant visual change, such as a shift in perspective or the introduction of new objects. The video segmentation module 235 may identify scenes change in the video by analyzing various elements, such as background, lighting, camera angle, and objects within the video. Additionally, the video segmentation module 235 may look for transition effects (e.g., cuts, fades) within the video. The application of transition effect typically signals a change in scene, and the video segmentation module 235 may use these cues as natural points to segment the video.

As depicted, the video clips 240 are provided and processed by the video feature extraction module 245, which extracts a range of features 250 from each clip to build a detailed profile of its content. The features 250 may include, but are not limited to, visual features, audio features, temporal features, cinematic features, video quality features, textual/subtitle features, color profile features, and motion dynamics features. These features reflect the attributes and stylistic elements of each clip, based on which the system may recognize patterns and select content that aligned with the user-defined preferences. In some embodiments, the visual features may refer to the visual characteristics of the target object within each clip. When the object is a landmark (e.g., building) or natural feature (e.g., mountain), visual features may include aspects such as its size, shape, distance, and surface texture. If the object is a human or an animal, visual features may capture details like facial expressions or body gestures. In embodiments where the object is a vehicle, visual features may include its color, size, and shape. In some embodiments, the audio features may refer to the audio details within the video, such as background sounds, music, or ambient noise. For example, a video may use natural sound as its background, like birdsong, wind, or flowing water. The video feature extraction module 245 may detect these sounds and categorize them as audio features of the clip. In some embodiments, the temporal features may refer to the time-based characteristics of each clip, such as the time of day or season. The temporal features may be used to identify day or night scenes or sequences that show specific times of the year (e.g., springtime, sunset). In some embodiments, the cinematic features may refer to the stylistic presentation of the clip, such as camera angles (e.g., left-side, right-side), framing styles (e.g., wide-angle, close-up), and others that contribute to the visual storytelling style of each scene. In some embodiments, the video quality features may refer to the technical specification of the video, including resolution (e.g., 1080 p, 4 k), bitrate, or frame rate. In some embodiments, the textual/subtitle features may refer to the characteristics of text overlays or subtitles included within the video clip. In some embodiments, the color profile features may define the color schemes of the video clips (e.g., warm vs. cool tones, high contrast vs. soft lighting). In some embodiments, the motion dynamics features may indicate the movement within each clip, such as the speed of object motion, transitions, or static or dynamic shots.

In the example workflow 200 (as depicted in FIG. 2B), after feature extraction, the features 250 are processed by the pattern recognition module 255 to identify patterns 260 within the video content. As used herein, a pattern 260 may refer to a structured arrangement of visual or auditory elements within video content. The pattern may contribute to the video's narrative flow and maintain thematic consistency. Patterns 260 may include camera movements (e.g., zoom-in, zoom-out, rotation), scene transitions (e.g., fad-in, fade-out, sharp cut), or applied visual or audio effects (e.g., color shifts, background sounds). By organizing the features into patterns, the system may understand how different features interact across clips. The pattern may be identified based on specific features. For example, zoom-in and zoom-out patterns may be recognized by analyzing changes in the size and position of objects across consecutive frames. In a zoom-in pattern, the size of an object or focal area gradually increases across frames, while in a zoom-out pattern, the object's size decreases gradually. The extracted features 250 and patterns 260 provide a comprehensive profile of each clip's content. In subsequent selection steps, the extracted features 250 and patterns 260 may guide the system to select clips that align with the user-defined preferences.

In some embodiments, trained machine learning models may be used in feature extraction and/or pattern recognition. For example, convolutional neural networks (CNNs) may be trained to process individual frames to identify visual features within the video clip, like as objects (e.g., mountains, trees), textures, colors, and lighting conditions. Recurrent neural network (RNNs), including long-short-term memory networks (LSTMs) and gated recurrent units (GRUs) may be used to process sequential data like audio. The RNNs may be trained to analyze audio within the video clip and identify different background sounds (e.g., wind, water flow, bird sounds). In some embodiments, natural language processing (NLP) algorithms may be used to detect and process textual information within a video, such as subtitles, captions, or text overlays. The NLP models may analyze the textual data to extract keywords or phrases, and categorize them into text features that reflect the video clip's content.

As depicted, the extracted features 250 and patterns 260 are processed by the video tagging module 265. The video tagging module 265 tags each video clip 270 with metadata based on the identified features 250 and patterns 260. These tags may provide a descriptive profile for each clip 270. With these tags, the system may organize the video clips 270 in a more structured manner within the database 220 and facilitate a more efficient search and retrieval of clips for a user request.

As depicted, the identified features 250, patterns 260, and user-defined preferences 215 (extracted from the user request 205) are provided to the script generation module 275. Using these inputs, in some embodiments, the script generation module 275 may first review the available features and patterns identified from each clips and compare them with the desired elements specified by the user. For example, the module 275 may evaluate each clip's visual, audio, and temporal features (e.g., objects, lighting, background sounds, and time of day) to identify those that best fit the user's requested themes and visual styles. Based on the identified features, the module 275 may then apply recognized patterns linked to these features, such as camera movements (e.g., zoom-in, zoom-out) and transitions (e.g., fade-in, fade-out, crossfade), to create a script 280 that establishes a natural flow in the video sequence. As used herein, the script 280 may refer to a document that organizes the video contents into a coherent sequence aligned with the user's preferences. The script may include a sequence of data points, each specifying a timeline (which defines the time range during which a clip or scene appear in the final video) (e.g., 00:00-00:50), an object (which is the primary object in the clip) (e.g., "mountain," "hiker," "wildlife"), an object type (e.g., landscape, person, or animal), specific features associated with the clip (e.g., "snowy," "daytime," "wide-angle shot," "1080p"), and specific patterns related to the clip (e.g., "zoom-in," "zoom-out"). The script 280 serves as a guide for video selection and assembly.

In some embodiments, the script may be adapted to align with the desired video length specified by the user. In embodiments where a specific length is indicated, the script generation module 275 may generate a script to fit within that time frame. However, in embodiments where no length is specified in the user request 205, the module 275 may create two versions of the script 280, one optimized for a longer video and another for a shorter video.

As illustrated, once the script 280 is generated, it is provided to the video selection module 285, which uses the detailed information within the script 280 to search through the video database. The video selection module 285 may check each data points in the script and search through the metadata of the available video clips 270 to identify candidate video clips 282 that match the specified timeline, object, features, and patterns. In some embodiments, for each data point, the video selection module 285 may look for clips that contain the object specified in the script (e.g., "White Mountain"). The video selection module 285 may filter clips based on visual, audio and temporal features specified in the script. For example, if a data point requires "snowy," "daytime," and "wide-angle shot," the module 285 may select clips tagged with these characteristics. The video selection module 285 may also consider the patterns identified in the script, such as camera movements (e.g., zoom-in, zoom-out, rotation) and thematic or transition effects (e.g., fade-in, fade-out, crossfade), and select clips with these patterns to match user's preferences. As depicted, the selected candidate video clips 282 are then passed to the video assembly module 290 to create the final video 295. In some embodiments, the video assembly module 290 may first arrange these candidate clips 282 according to the timeline as indicated in the script 280. Such arrangement ensures that each clip appears in the specified time range and sequence. After that, the video assembly module 290 may apply transitions (e.g., fade-in, fade-out, crossfade) and/or visual or audio effects (e.g., chosen to fit the visual style and pacing as indicated in the script) as necessary to create a cohesive narrative flow throughout the video.

Once the video assembly is complete, the output video 295 is sent to the user for review through a user interface (UI), such as web-based video player or an application interface. The user may view the video and provide additional comments or feedback. These comments may then be processed by the automated video generation system, following a similar workflow as the original request. In embodiments where the user updates the target object 215-1, the feedback may first be processed by the request processing module 210. The updated target object may then be provided to the video retrieval module 225, which searches for any additional video content 230 that meets the new specifications. If the target object remains unchanged but other preferences are updated, the system may bypass the video retrieval operation and directly update the script 280 to incorporate the new preferences. The updated script may then be used to select new candidate video clips 282 or modify the sequence of existing clips to fulfil the revised request.

The module depicted, including the request processing module 210, video retrieval module 225, video segmentation module 235, object feature extraction module 245, pattern recognition module 255, video tagging module 265, script generation module 275, video selection module 285, and video assembly module 290, are provided conceptual clarity in describing the video generation process. In some embodiments, the operations of the depicted modules (and others not illustrated) may be combined or distributed across any number of modules or components. Further, the operations of these modules (and others not illustrated) may be implemented through hardware, software, or a combination of both.

Figure 3A:
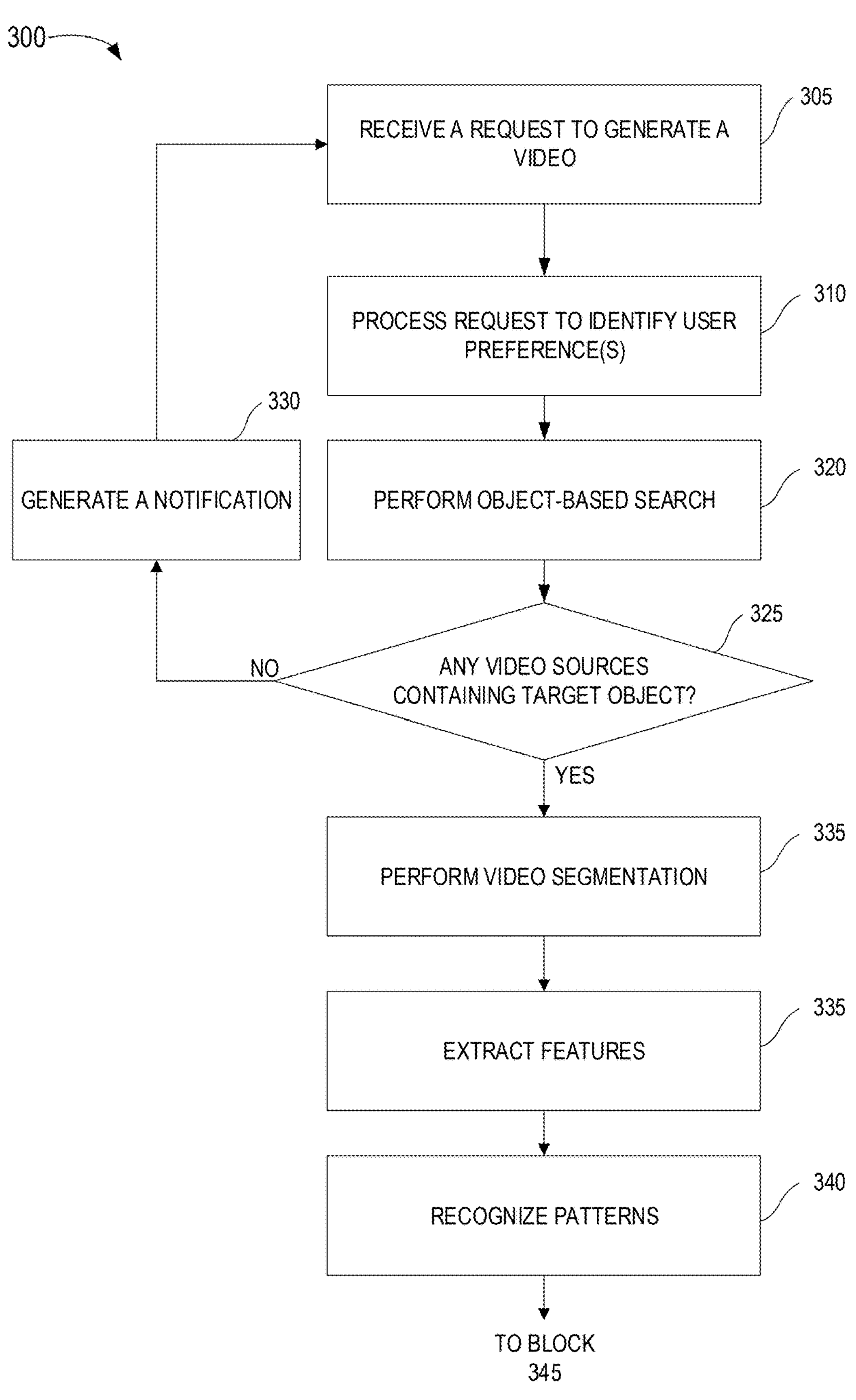
FIGS. 3A and 3B depict an example method for creating a video with user-defined requirements based on random video resources, according to some embodiments of the present disclosure.
Figure 3B:
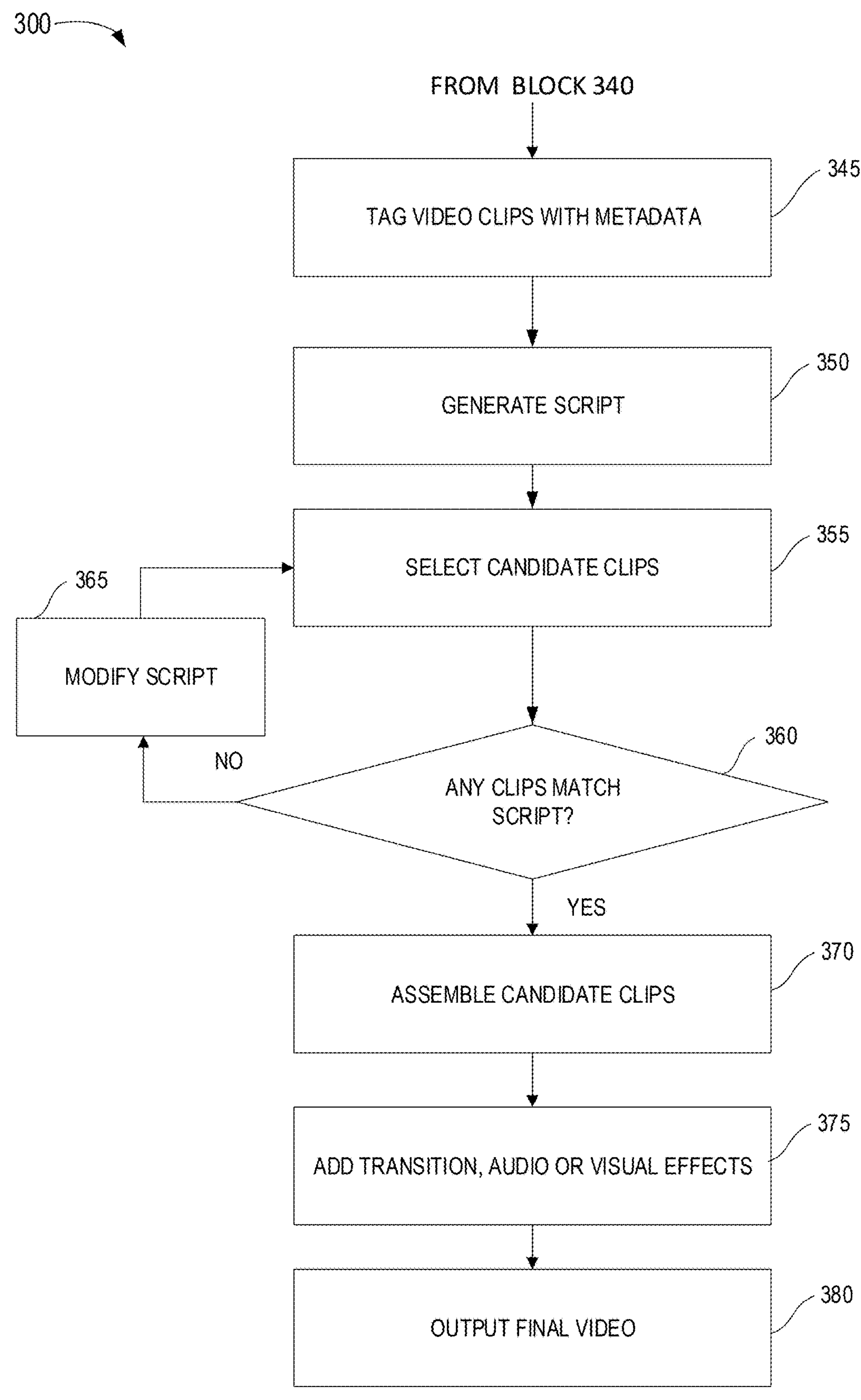
Figure 5:
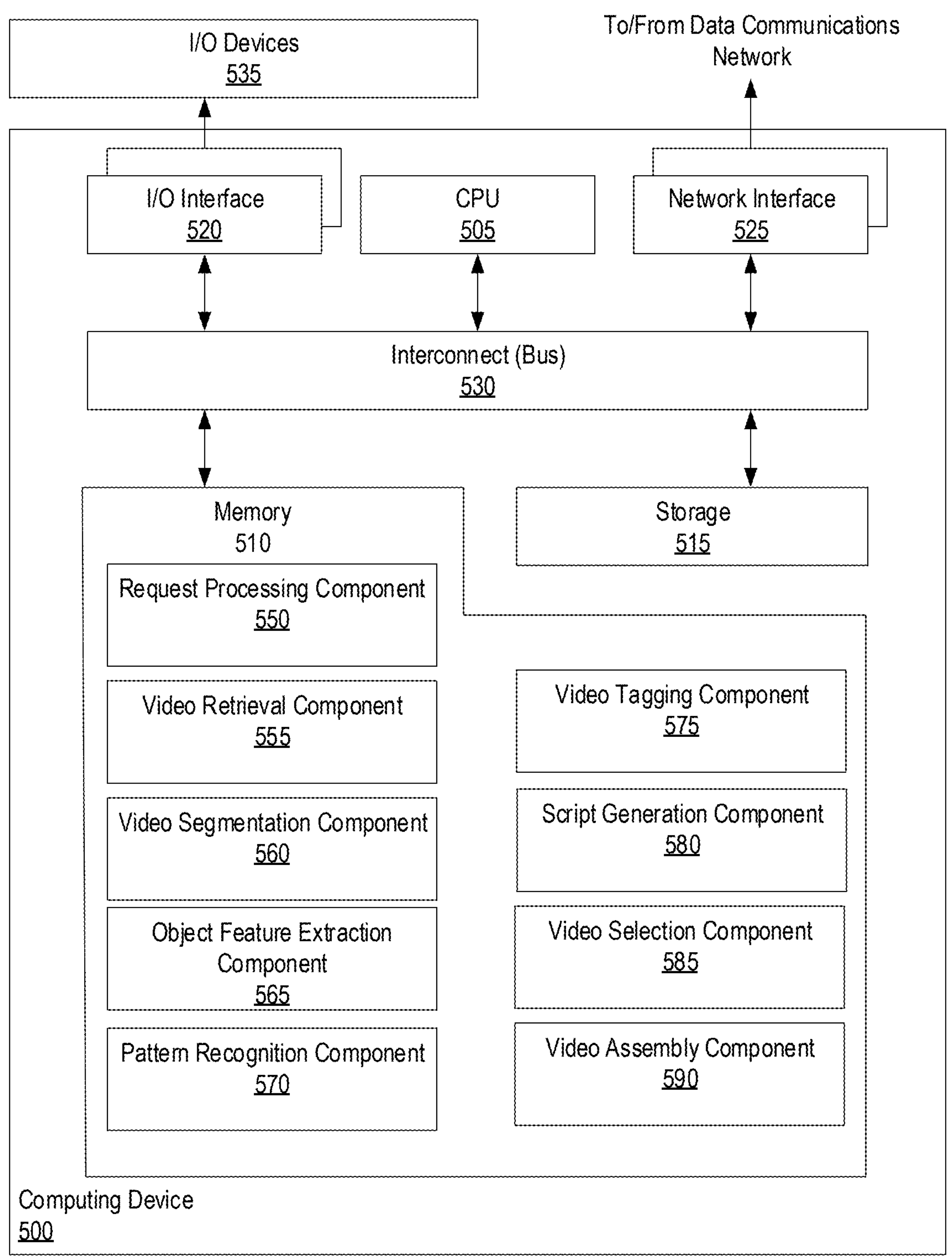
FIG. 5 depicts an example computing device configured to perform various aspects of the present disclosure, according to some embodiments of the present disclosure.

FIGS. 3A and 3B depict an example method 300 for creating a video with user-defined requirements based on random video resources, according to some embodiments of the present disclosure. In some embodiments, the method 300 may be performed by one or more computing devices or systems, such as the computer 101 as depicted in FIG. 1, the computing device 500 as depicted in FIG. 5, or the computing device that includes the depicted modules in FIG. 3.

At block 305, an automated video generation system receives a user request (e.g., 205 of FIG. 2A) to generate a video. The request may be in natural language and include detailed descriptions indicating the user's preferences for the video, such as the target object, the desired video length, and style preferences.

At block 310, the system analyzes the user request to extract specific elements (e.g., 215 of FIG. 2A) relevant to video creation. These elements may include the target object (e.g., 215-1 of FIG. 2A), desired video length (e.g., 215-2 of FIG. 2A), visual elements (e.g., 215-3 of FIG. 2A), audio elements (e.g., 215-4 of FIG. 2A), temporal elements (e.g., 215-5 of FIG. 2A), cinematic styles (e.g., 215-6 of FIG. 2A), video quality preferences (e.g., 215-7 of FIG. 2A), and the like. These elements may provide a structure basis for further processing and video generation.

At block 315, using the target object identified in the request, the system performs an object-based search through the video database (e.g., 220 of FIG. 2A). This may involve searching the videos that contain the target object using metadata and object recognition algorithms.

At block 320, the system checks if any video resources containing the target object (e.g., 230 of FIG. 2A) are found. If the videos with the target object are found, the method 300 proceeds to block 335. If no such videos are found, the method 300 moves to block 330.

At block 330, the system generates a notification to the user. The notification informs the user that no video resources containing the specified target object are found in the current video database. Based on the notification, the user may adjust the request accordingly.

At block 335, the system divides the identified videos (e.g., 230 of FIG. 2A) into smaller clips (e.g., 240 of FIG. 2A). In some embodiments, the segmentations may be performed based on content cues, such as scene changes or camera angle shifts. The segmentation enables easier analysis and selection of individual scenes for the final video, as smaller clips with a single scene, object, or camera angle may provide more focused and relevant content for alignment with user-defined preferences.

At block 340, the system analyzes each segmented clip (e.g., 240 of FIG. 2A) to identify relevant features (e.g., 250 of FIG. 2A). In some embodiments, the features refer to the visual, audio, temporal and other aspect characteristics of the video clips. When the object is a landmark or natural feature (e.g., mountain, building), the visual features may include attributes like color, shape, distance, and surface texture. When the object is a human or an animal, the visual feature may capture details like facial expressions, body gestures, and clothing. Other features related to audio characteristics, cinematic techniques, video quality, and other characteristics may also be extracted.

At block 345, the system recognizes patterns (e.g., 260 of FIG. 2B) based on the extracted features (e.g., 250 of FIG. 2B). The patterns may reflect various aspects of the video's composition style, such as camera movements (e.g., zoom-in, zoom-out, rotation), scene transitions (e.g., fad-in, fade-out, sharp cut), or applied visual or audio effects (e.g., color shifts, background sounds). In some embodiments, patterns may be identified by analyzing changes in visual features across frames. For example, patterns related to camera movements, such as zoom-in and zoom-out, may be detected through examining changes in object size or scales, which indicate shifts in focus or perspective. In addition, by analyzing gradual shifts in brightness across frames, the system may identify patterns like fade-in and fade-out related to video transitions.

At block 350 (in FIG. 3B), the system creates tags for each clip based on the identified features and patterns. These tags provide a comprehensive profile of the video content. Using these tags along with the user-defined preferences, the system may quickly locate clips that match specific requirements, such as particular visual themes, audio characteristics, or camera movements.

At block 355, the system generates a script (e.g., 280 of FIG. 2B) for the new video based on the user-defined preferences and the identified features and patterns. The script may include a sequence of data points, each specifying timing, content, and stylistic elements within the final video. In some embodiments, each data point may include a timeline (which defines when each clip should begin and end within the final video), an object (which indicates the main focus of each clip), an object type, and one or more features and patterns (which details required visual, audio, or temporal features and patterns to maintain stylistic consistency). In embodiments where the user has specified a desired video length, the system may tailor the script accordingly to meet the timing requirements. If no length is specified, the system may generate two versions of the script, one for a shorter and more concise video and another for a longer and more detailed video.

At block 360, the system runs through the available video clips with metadata (e.g., 270 of FIG. 2B) and compares each clip against the specific requirements indicated in the script. For each data point in the script, the system reviews the metadata tags of each clip, particularly focusing on elements like the object, object type, or any features and patterns specified. If the system finds clips that fully match a data point's requirements, these clips are marked as candidate clips (e.g., 282 of FIG. 2B), and the method 300 proceeds to block 370. If multiple clips satisfy the same requirements, in some embodiments, the system may prioritize these clips based on criteria such as relevance to the user's requirements or video quality. If no match clips are found, the method 300 moves to block 365, where the system adjusts the script slightly (e.g., relaxing certain criteria) and performs a new search. For example, if a specific pattern or feature cannot be fulfilled, the system may use a clip with similar characteristics or send a notification for user feedback. If multiple attempts to find a match are unsuccessful, in some embodiments, the system may generate a notification informing the user that specific criteria were not met. The notification may prompt the user to make certain adjustments to the request.

At block 370, the system organizes the selected candidate clips (e.g., 282 of FIG. 2B) along the timeline specified in the script, following the sequence and timing of each data point. At block 375, the system applies transitions and additional effects as necessary to create a cohesive narrative flow. If the clips already contain transitions (e.g., fade-in, fade-out, crossfade) or effects (e.g., zoom-in, zoom-out, rotation) specified in the script, the system integrates these directly into the final video output. If certain clips lack transitions or if supplementary effects are needed (e.g., to unify the appearance and sound across clips), the system may add these elements to the final video output to facilitate a smooth flow between scenes and maintain a consistent visual and auditory style.

At block 375, the final video is delivered to the user for review through UI, such as a web-based player or an application interface. The user may provide further feedback to edit the final video, and the method 300 returns to block 305, where the system reprocesses the updated request, adjusts the script accordingly, and re-selects candidate clips as needed. The iterative process allows the system to fine-tune the final video continuously until it satisfy the user's requirements.

Figure 4:
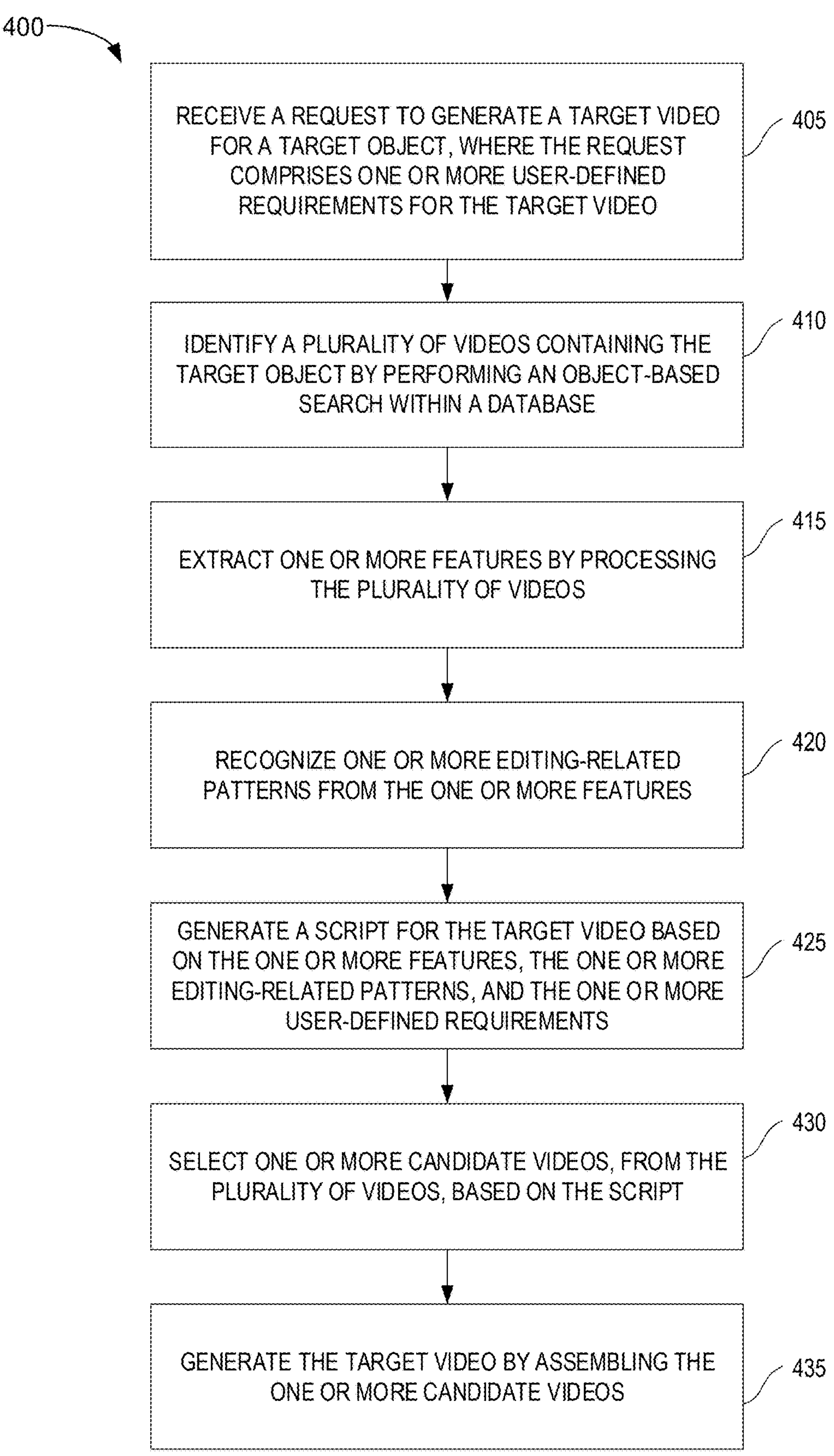
FIG. 4 is a flow diagram depicting an example method for automated video creation, according to some embodiments of the present disclosure.

FIG. 4 is a flow diagram depicting an example method 400 for automated video creation, according to some embodiments of the present disclosure.

At block 405, a computing device receives a request (e.g., 205 of FIG. 2B) to generate a target video (e.g., 295 of FIG. 2B) for a target object, wherein the request comprises one or more user-defined requirements for the target video.

At block 410, the computing device identifies a plurality of videos containing the target object (e.g., 230 of FIG. 2A) by performing an object-based search within a database (e.g., 220 of FIG. 2A).

At block 415, the computing device extracts one or more features (e.g., 250 of FIG. 2A) by processing the plurality of videos.

At block 420, the computing device recognizes one or more editing-related patterns (e.g., 260 of FIG. 2B) from the one or more features.

At block 425, the computing device generates a script (e.g., 280 of FIG. 2B) for the target video based on the one or more features (e.g., 250 of FIG. 2B), the one or more editing-related patterns (e.g., 260 of FIG. 2B), and the one or more user-defined requirements.

At block 430, the computing device selects one or more candidate videos (e.g., 282 of FIG. 2B), from the plurality of videos, based on the script (e.g., 280 of FIG. 2B).

At block 435, the computing device generates the target video (e.g., 295 of FIG. 2B) by assembling the one or more candidate videos (e.g., 282 of FIG. 2B).

In some embodiments, the computing device may further segment each of the plurality of videos into one or more video clips (e.g., 240 of FIG. 2A) based on the target object and the one or more user-defined requirements.

In some embodiments, each of the one or more user-defined requirements may comprise text descriptions in natural language. In some embodiments, the computing device may further extract one or more elements (e.g., 215 of FIG. 2A) from each of the one or more user-defined requirements, where the one or more elements may be used to generate the script of the target video, and the one or more elements may comprise information indicating at least one of the target object (e.g., 215-1 of FIG. 2A), a desired video length (e.g., 215-2 of FIG. 2A), one or more desired visual, audio, or temporal features (e.g., 215-3, 215-4, or 215-5 of FIG. 2A), one or more desired cinematic styles (e.g., 215-6 of FIG. 2A), or a video quality preference (e.g., 215-7 of FIG. 2A).

In some embodiments, the computing device may further tag each of the plurality of videos with metadata that reflect the one or more features and the one or more editing-related patterns.

In some embodiments, the script for the target video may comprise a sequence of data points, each data point comprising a timeline, an object, an object type, one or more target features aligned with the one or more user-defined requirements, and one or more target patterns aligned with the one or more user-defined requirements.

In some embodiments, to generate the target video by assembling the one or more candidate videos (e.g., 282 of FIG. 2B), the computing device may arrange the one or more candidate videos according to the timeline specified for each data point in the script, and apply one or more transition effects to connect the one or more candidate videos to create a thematic flow aligned with the one or more user-defined requirements.

In some embodiments, the computing device may further receive a second request following the generation of the target video, the second request (e.g., 205 of FIG. 2A) indicating one or more changes to the target video, adjust the script (e.g., 280 of FIG. 2B) to incorporate the one or more changes, select one or more new candidate videos (e.g., 282 of FIG. 2B), from the plurality of videos, based on the adjusted script, and generate an updated target video by assembling the one or more new candidate videos.

In some embodiments, the one or more features (e.g., 250 of FIG. 2B) are extracted from the plurality of videos by applying one or more trained machine learning (ML) models, wherein the ML model are selected from the group consisting of a convolutional neural network used to detect one or more visual features, a recurrent neural network to detect one or more audio features, and a natural language processing model used to detect one or more textual features.

FIG. 5 depicts an example computing device 500 configured to perform various aspects of the present disclosure, according to some embodiments of the present disclosure. Although depicted as a physical device, in some embodiments, the computing device 500 may be implemented using virtual device(s), and/or across a number of devices (e.g., in a cloud environment).

As illustrated, the computing device 500 includes a CPU 505, memory 510, storage 515, one or more network interfaces 525, and one or more I/O interfaces 520. In the illustrated embodiment, the CPU 505 retrieves and executes programming instructions stored in memory 510, as well as stores and retrieves application data residing in storage 515. The CPU 505 is generally representative of a single CPU and/or GPU, multiple CPUs and/or GPUs, a single CPU and/or GPU having multiple processing cores, and the like. The memory 510 is generally considered to be representative of a random access memory. Storage 515 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O devices 535 (such as keyboards, monitors, etc.) are connected via the I/O interface(s) 520. Further, via the network interface 525, the computing device 500 can be communicatively coupled with one or more other devices and components (e.g., via a network, which may include the Internet, local network(s), and the like). As illustrated, the CPU 505, memory 510, storage 515, network interface(s) 525, and I/O interface(s) 520 are communicatively coupled by one or more buses 530.

In the illustrated embodiment, the memory 510 includes a request processing component 550, a video retrieval component 555, a video segmentation component 560, an object feature extraction component 565, a pattern recognition component 570, a video tagging component 575, a script generation component 580, a video selection component 585, and a video assembly component 590. Although depicted as discrete components for conceptual clarity, in some embodiments, the operations of the depicted components (and others not illustrated) may be combined or distributed across any number of components. Further, although depicted as software residing in memory 510, in some embodiments, the operations of the depicted components (and others not illustrated) may be implemented using hardware, software, or a combination of hardware and software.

In one embodiment, the request processing component 550 may correspond to the request processing module 210 as depicted in FIG. 2A. The request processing component 550 may be configured to analyze user requests to extract preferences, such as target object, video length, and visual and audio elements. The extracted preferences may then be used for further searches and script generation.

In one embodiment, the video retrieval component 555 may correspond to the video retrieval module 225 as depicted in FIG. 2A. The video retrieval component 555 may conduct an object-based search through a video database (e.g., 220 of FIG. 2A), and identify and retrieve videos that contain the target object or scene indicated within the user request.

In one embodiment, the video segmentation component 560 may correspond to the video segmentation module 235 as depicted in FIG. 2A. The video segmentation component 560 may be configured to divide retrieved videos (e.g., 230 of FIG. 2A) into smaller clips based on video contents, such as scene changes or shifts in camera angle or lighting. The smaller clips may help to perform more efficient feature extraction and pattern recognition.

In one embodiment, the object feature extraction component 565 may correspond to the object feature extraction module 245 as depicted in FIG. 2A. The object feature extraction component 565 may be configured to analyze each clip to identify relevant features, including visual, audio, or temporal characteristics, color schemes, video quality markers, camera angles, framing styles, and other relevant aspects.

In one embodiment, the pattern recognition component 570 may correspond to the pattern recognition component 255 as depicted in FIG. 2B. The pattern recognition component 570 may be configured to process the extracted features (e.g., 250 of FIG. 2B) to identify recurring patterns (e.g., 260 of FIG. 2B) within the clips, such as camera movements, scene transitions, or any visual or audio effects.

In one embodiment, the video tagging component 575 may correspond to the video tagging module 265 as depicted in FIG. 2B. The video tagging component 575 may be configured to tag each clip with metadata derived from the identified features and patterns. This operation may allow for organized retrieval and alignment with user-defined preferences in subsequent operations.

In one embodiment, the script generation component 580 may correspond to the script generation module 275 as depicted in FIG. 2B. The script generation component 580 may be designed to generate a script that defines the timeline, content, and style of the final video.

In one embodiment, the video selection component 585 may correspond to the video selection module 285 as depicted in FIG. 2B. The video selection component 585 may be configured to select candidate clips that align with the script and the user-defined preferences.

In one embodiment, the video assembly component 590 may correspond to the video assembly module 290 as depicted in FIG. 2B. The video assembly component 590 may be configured to combine the selected clips along a timeline according to the script. The video assembly component 590 may further apply necessary transitions and visual or audio effects to create a cohesive final video output.

In the illustrated example, the storage 515 may include various types of data for effective operations of the computing device for automated video generation. The data may include, but are not limited to, user requests, video files or resources, extracted features and patterns, generated scripts, and trained ML models and algorithms for feature extraction. In some embodiments, the aforementioned data may be saved in a remote database that connects to the computing device 500 via a network (e.g., the Internet).

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method for video generation, comprising:

receiving a request to generate a target video for a target object, wherein the request comprises one or more user-defined requirements for the target video;

identifying, from a video database, a plurality of existing videos that include the target object by performing an object-based search within the video database;

extracting one or more video-related features from the plurality of existing videos by processing the plurality of existing videos;

recognizing one or more editing-related patterns from the one or more video-related features based on changes in the extracted one or more video-related features across frames;

generating a script for the target video based on the one or more video-related features, the one or more editing-related patterns, and the one or more user-defined requirements;

selecting one or more candidate videos, from the plurality of existing videos, based on the script; and generating the target video by assembling the one or more candidate videos.

2. The method of claim 1, further comprising segmenting each of the plurality of existing videos into one or more video clips based on the target object and the one or more user-defined requirements.

3. The method of claim 1, wherein each of the one or more user-defined requirements comprises text descriptions in natural language, the method further comprising:

extracting one or more elements from each of the one or more user-defined requirements, wherein the one or more elements are used to generate the script of the target video, and wherein the one or more elements comprise information indicating at least one of the target object, a desired video length, one or more desired visual, audio, or temporal features, one or more desired cinematic styles, or a video quality preference.

4. The method of claim 1, further comprising tagging each of the plurality of existing videos with metadata that reflect the one or more features and the one or more editing-related patterns.

5. The method of claim 1, wherein the script for the target video comprises a sequence of data points, each data point comprising a timeline, an object, an object type, one or more target features aligned with the one or more user-defined requirements, and one or more target patterns aligned with the one or more user-defined requirements.

6. The method of claim 5, wherein generating the target video by assembling the one or more candidate videos comprises:

arranging the one or more candidate videos according to the timeline specified for each data point in the script; and applying one or more transition effects to connect the one or more candidate videos to create a thematic flow aligned with the one or more user-defined requirements.

7. The method of claim 1, further comprising:

receiving a second request following the generation of the target video, the second request indicating one or more changes to the target video;

adjusting the script to incorporate the one or more changes;

selecting one or more new candidate videos, from the plurality of existing videos, based on the adjusted script; and generating an updated target video by assembling the one or more new candidate videos.

8. The method of claim 1, wherein the one or more features are extracted from the plurality of existing videos by applying one or more trained machine learning (ML) models, wherein the one or more trained ML models are selected from the group consisting of a convolutional neural network used to detect one or more visual features, a recurrent neural network to detect one or more audio features, and a natural language processing model used to detect one or more textual features.

9. A system, comprising:

a processor set;

one or more computer-readable storage media; and program instructions stored on the one or more computer-readable storage media to cause the process set to perform operations comprising:

receiving a request to generate a target video for a target object, wherein the request comprises one or more user-defined requirements for the target video;

identifying, from a video database, a plurality of existing videos that include the target object by performing an object-based search within the video database;

extracting one or more video-related features from the plurality of existing videos by processing the plurality of existing videos;

recognizing one or more editing-related patterns from the one or more video-related features based on changes in the extracted one or more video-related features across frames;

generating a script for the target video based on the one or more video-related features, the one or more editing-related patterns, and the one or more user-defined requirements;

selecting one or more candidate videos, from the plurality of existing videos, based on the script; and generating the target video by assembling the one or more candidate videos.

10. The system of claim 9, wherein the operation further comprises segmenting each of the plurality of existing videos into one or more video clips based on the target object and the one or more user-defined requirements.

11. The system of claim 9, wherein each of the one or more user-defined requirements comprises text descriptions in natural language, and wherein the operation further comprises:

extracting one or more elements from each of the one or more user-defined requirements, wherein the one or more elements are used to generate the script of the target video, and wherein the one or more elements comprise information indicating at least one of the target object, a desired video length, one or more desired visual, audio, or temporal features, one or more desired cinematic styles, or a video quality preference.

12. The system of claim 9, wherein the operations further comprise tagging each of the plurality of existing videos with metadata that reflect the one or more features and the one or more editing-related patterns.

13. The system of claim 9, wherein the script for the target video comprises a sequence of data points, each data point comprising a timeline, an object, an object type, one or more target features aligned with the one or more user-defined requirements, and one or more target patterns aligned with the one or more user-defined requirements.

14. The system of claim 13, wherein generating the target video by assembling the one or more candidate videos comprises:

arranging the one or more candidate videos according to the timeline specified for each data point in the script; and applying one or more transition effects to connect the one or more candidate videos to create a thematic flow aligned with the one or more user-defined requirements.

15. The system of claim 9, wherein the operations further comprise:

receiving a second request following the generation of the target video, the second request indicating one or more changes to the target video;

adjusting the script to incorporate the one or more changes;

selecting one or more new candidate videos, from the plurality of existing videos, based on the adjusted script; and generating an updated target video by assembling the one or more new candidate videos.

16. The system of claim 9, wherein the one or more features are extracted from the plurality of existing videos by applying one or more trained machine learning (ML) models, wherein the one or more trained ML models are selected from the group consisting of a convolutional neural network used to detect one or more visual features, a recurrent neural network to detect one or more audio features, and a natural language processing model used to detect one or more textual features.

17. One or more non-transitory computer-readable media containing, in any combination, computer program code that, when executed by a computer system, performs operations comprising:

receiving a request to generate a target video for a target object, wherein the request comprises one or more user-defined requirements for the target video;

identifying, from a video database, a plurality of existing videos that include the target object by performing an object-based search within the video database;

extracting one or more video-related features from the plurality of existing videos by processing the plurality of existing videos;

recognizing one or more editing-related patterns from the one or more video-related features based on changes in the extracted one or more video-related features across frames;

generating a script for the target video based on the one or more video-related features, the one or more editing-related patterns, and the one or more user-defined requirements;

selecting one or more candidate videos, from the plurality of existing videos, based on the script; and generating the target video by assembling the one or more candidate videos.

18. The one or more non-transitory computer-readable media of claim 17, wherein the operations further comprises segmenting each of the plurality of existing videos into one or more video clips based on the target object and the one or more user-defined requirements.

19. The one or more non-transitory computer-readable media of claim 17, wherein the operations further comprises tagging each of the plurality of existing videos with metadata that reflect the one or more features and the one or more editing-related patterns.

20. The one or more non-transitory computer-readable media of claim 17, wherein generating the target video by assembling the one or more candidate videos comprises:

arranging the one or more candidate videos according to a timeline indicated within the script; and applying one or more transition effects to connect the one or more candidate videos to create a thematic flow aligned with the one or more user-defined requirements.

* * * * *